United States Patent Office 3,300,401
Patented Jan. 24, 1967

3,300,401
PROCESS FOR DEWATERING ORGANIC SLUDGE WHICH HAS BEEN SEPARATED DURING TREATMENT OF WASTE WATER
Heinrich Sontheimer, Auf dem Seif 9, Falkenstein, Taunus, Germany, and Dieter Heinicke, Staufenstrasse 36, Frankfurt am Main, Germany
No Drawing. Filed Nov. 29, 1963, Ser. No. 327,120
Claims priority, application Germany, Dec. 1, 1962, M 54,983
6 Claims. (Cl. 210—5)

This invention relates to the treatment of organic sludges which result from the treatment of waste water. More specifically, this invention relates to a method of biologically treating the sludge-water mixture remaining after partial solids separation from a raw or anaerobically digested sludge by mechanical means.

It is an object of this invention to provide a method of removing fine and colloidal suspended solids from the sludge-water mixture remaining when raw or digested sludge has been subjected to partial solids separation by mechanical means.

Another object is to provide a process of this general type which is effective and economical.

Another object is to provide a process wherein the sludge-water mixture resulting from centrifuging or straining of raw or digested sludge is treated by aerobic digestion to remove at least 15% of the solids contained therein by oxidation.

Another object is to provide a process for increasing settleability of fine and colloidal solids in the centrate resulting from centrifuging raw or digested sludge by aerobic biological treatment of the centrate.

Another object is to provide a process for the aerobic biological treatment of the centrate resulting from centrifuging digested sludge together with the supernatant from the anaerobic digester.

Other objects will become apparent upon consideration of the detailed description and claims which follow.

The term "raw sludge" is used herein to denote the sludge from a primary clarifier or that from a secondary clarifier following a biological treatment in an activated sludge aeration basin or a trickling filter, or a mixture of such sludges. The term "digested sludge," as used herein, denotes anaerobically digested sludge.

The treatment and elimination of sludges which originate from the treatment of waste waters and contain organic matter is difficult. For the sludges from the purification of domestic sewage the preferred treatment consists in subjecting the sludge to anaerobic digestion, wherein a part of the organic substance is decomposed. The remaining solids, however, are in the form of an aqueous suspension, which requires dewatering. The anaerobic decomposition of such biologic sludges serves primarily for avoiding odor nuisance.

It is known that the anaerobic decomposition can be replaced by aerobic treatment. In this aerobic treatment oxygen is introduced into the sludge suspension by aeration, and a part of the organic substance is oxidized thereby and ingested by the bacteria. In comparison to the anaerobic sludge treatment this manner of operation has the advantage of a short treatment period. Whereas anaerobic digestion requires a treatment time of 20 to 60 days, aerobic decomposition requires only 4 to 8 days. For aerobic sludge treatment the capital investment is substantially lower, but the operating expenses are higher. Aerobic sludge treatment has, therefore, been used to-date mainly in small plants and preferably jointly with the biologic waste water treatment in the same basin. In this basin a sufficiently long retention time must be provided.

It is also known to dewater raw or digested sludges by mechanical means. In accordance with the degree of effect of such mechanical dewatering equipment two main methods can be distinguished, complete and partial solids separation.

Complete separation of all solids in one cycle of operation is usually carried out by filtration with addition of flocculants or filter aids to increase the speed of filtration. Due to the use of these chemicals operation becomes relatively expensive.

In partial solids separation only the readily separable solids are separated in highly dewatered form. Centrifuges or straining apparatus are used therefor. These apparatus have the great advantage over filters that a chemical pretreatment of the sludge is not required. The operating costs of these apparatus are extremely low. They separate about 50–80% of the solids, mostly the coarser ones, in highly dewatered form. The fine and colloidal solids remaining in the sludge-water mixture leaving the straining device or the centrifuge are very difficult to separate. Thus, the filterability of such a sludge-water mixture after separation of the coarser sludge particles is usually considerably worse than the filterability of the complete sludge. It has been tried repeatedly to treat organic sludges by means of decanting centrifuges in such manner that a portion of the sludge is separated in solid form and the centrate is passed to drying beds. This method of operation has some effect only with very well digested sludges. It cannot be used for incompletely digested or raw sludges. With sludge waters from sludges which have not been fully digested, no rapid dewatering occurs on the drying bed, but putrefaction with strong odors takes place. Of the numerous known processes for treating sludges by means of a partial solids separation, only those processes have been successful in practice where the dewatering of the remaining sludge-water mixture is carried out with the aid of ash from the incineration of the sludge.

It has been discovered that the detrimental effects of the fined and colloidal sludge solids remaining in the sludge-water mixture after partial separation of solids from waste water sludges can be eliminated in simple manner by subjecting this sludge-water mixture to a biological treatment. Such a biological treatment can be carried out in the same manner as in the activated sludge process and is applicable to sludge-water mixtures from raw and digested sludges. In all cases certain microorganisms accumulate due to the biological treatment, which are able to act biologically on the colloidal and fine organic substances in the sludge-water mixture and to partially remove them by endogenous respiration.

The process for treating organic sludges from the waste water purification by partial separation of the solids with centrifuges or straining apparatus followed by treatment of the resulting sludge water is characterized by subjecting the sludge water to aerobic biological digestion.

The treatment of organic raw or digested waste sludges by partial mechanical separation of solids followed by biological treatment of the sludge water has the advantage over the known direct aerobic treatment of the entire sludge that with the mechanically separated organic substance those materials are separated in solid form which are difficult to attack by biological means, so that in the remaining sludge-water mixture those substances are contained which can readily be treated biologically. Consequently, the biological conditions can be controlled much better than with direct treatment of the entire sludge, particularly when the latter is carried out in combination with the biological treatment of the waste water. Furthermore, since less organic substance is introduced into the aeration basin, the cost of operation of the biological process is lower.

The partial separation of solids from the organic sludge prior to the biological treatment according to the invention can be carried out by means of any suitable apparatus, particularly decanting centrifuges of known construction or straining devices which may be followed by presses. By means of such apparatus a solids portion with very low water content is separated from the organic sludge. With a decanting centrifuge solids contents in the centrifuged sludge of 40–50% can be reached without difficulty; this is entirely sufficient for subsequent preparation of compost. The sludge water originating from the centrifuge, strainer or the like containing preferably the finest and colloidal solids, is treated aerobically by aeration until it is no longer putrescible.

It has been found that the centrate of raw sludge which has been biologically treated in accordance with the invention, can be further treated by centrifuging or can be dewatered on a drying bed in a relatively short time and without any odor nuisance. For this biological treatment only about half the enery is required which is used up by direct aerobic treatment and subsequent dewatering on drying beds of the entire raw sludge.

For the aerobic oxidation of such sludge waters the aeration space is proportioned so that 3–7 kg. solids are introduced per m.³ of aeration space per day. By introducing oxygen in an amount of about 0.6–1.0 kg./kg. of introduced solids, about 15–50% of the solids are aerobically oxidized with the above load. Sometimes oxidation of 5–10% is sufficient. The flocculating characteristics of the sludge are thereby so much improved, that further treatment is possible without difficulties. The oxidized solids which are removed from the process by the biological treatment are particularly those which make subsequent treatment so difficult. The efficiency of filtration, which was with an original centrate only 10 l./m.²/h. (liter per square meter per hour), when adding 0.2/g. (gram) lime per g. solids, could be increased to 100 l./m.²/h. by the aerobic treatment of the centrate according to the invention. The settleability was also considerably increased by the aerobic treatment. With a sludge water from sludge centrifuging a substantial degree of separation could be obtained after the biological treatment. While the centrate from a decanting centrifuge has scarcely any tendency to settle even after prolonged standing, after the biological treatment about 50% of the water with a relatively low degree of turbidity can be decanted by simple sedimentation.

Instead of sedimentation, dissolved air or vacuum flotation is also suitable for intermediate thickening of the aerobically treated sludge-water mixture. Vacuum flotation can be carried out in simple manner by subjecting the sludge in a suitable container to a vacuum, whereby the gas escapes from the sludge and carries the solids to the surface, where they can be withdrawn as scum. In some cases this can be effected directly by the vacuum pump. After destruction of the scum, a sludge with a solids content of 5–10% remains and the waste water is largely freed of solids.

The concentration of the solids by flotation can also be combined with the aeration by withdrawing the foam from the surface of the aeration basin.

When using a decanting centrifuge as the preliminary separation apparatus, the aerobically treated sludge water can be mixed after an intermediate thickening with the inflow to the centrifuge. The solids which previously could not be separated on the centrifuge can be centrifuged after the biological treatment, so that eventually all solids, as far as they have not been removed by oxidation, can be separated by centrifuging. This manner of operation can be used also with straining devices. By using the intermediate biological treatment and thickening steps, it is possible, e.g., to completely dewater sludges from municipal sewage plants by means of dewatering equipment which in and of itself permits only the dewatering of a portion of the sludges.

If the solids remaining after the aerobic biological treatment are to be returned to the centrifuge or staining device, a relatively high solids portion should be removed by oxidation. With sludges from domestic sewage this portion is about 30%. It is, however, also possible to return to the dewatering apparatus only a part of the treated sludge water and to treat the balance of the sludge water from the biological basin directly on drying beds. In such case it is sufficient to oxidize 10–20% of the solids, which permits a correspondingly smaller expenditure of energy for dewatering and the biological treatment step. Instead of treatment on drying beds, filtration on vacuum or pressure filters may be used, which may have advantages with regard to operating expenses.

With digested sludge, the aerobic oxidation can be carried so far that a large part of the ammonia contained in the sludge-water mixture is oxidized to nitrate. If the waste water resulting from the oxidation treatment is mixed with raw waste water or sludge, a biological reduction of the nitrates takes place, whereby a large part of the nitrogen compounds, which otherwise are discharged with the digester supernatant to the river, is eliminated as nitrogen. When operating in this manner the usual unfavorable influence of the digester supernatant on the biological purification is prevented, and it becomes possible to carry out, jointly with the aerobic sludge-water treatment, also the biological purification of the digester supernatant which, when carried out alone, causes great difficulties.

In a municipal clarification plant 25 m.³ of thickened raw sludge with a solids content of 6% by weight are produced per day by the mechanical and biological waste water treatment. This sludge is treated on a conventional decanting centrifuge with an output of 5 m.³/h., whereby 60% of the solids with a solids content of 40–50% are separated. There remain about 23 m.³ centrate with a solids content of 2.5% which is not suitable for further thickening by sedimentation and can be filtered only with great expense. A direct return to a point upstream of the centrifuge leads to a rapid deterioration of the efficiency of separation due to the build up of the fine and colloidal solids in the circulation.

In accordance with the invention the centrate is treated in an aeration basin having a volume of about 125 m.³ and a retention time of about 5 days. In the aeration basin aerating devices are provided which are capable of thorough mixing and of introducing about 600 kg. oxygen per day under standard conditions. About 200 kg. per day of the suspended substance are destroyed by aerobic decomposition. The aerobically treated centrate which contains about 1.75% solids, can be added to the fresh sludge going to the centrifuge, after thickening it to a solids concentration of about 3–6%. From the thickener a portion of the thickened sludge can be returned to the aeration basin, whereby the sludge concentration is increased and the treating period shortened.

By returning the biologically treated thickened centrate to a point upstream of the centrifuge, all sludge materials can ultimately be separated on the centrifuge in solid form. This involves a circulation of solids which, in their original state, cannot be centrifuged. Due to the aerobic treatment a build up of such solids in the circulation is prevented. With a total of 25 m.³ of raw sludge containing 1500 kg. solids, about 36 m.³ of sludge with a total of about 2165 kg. solids must be treated in the centrifuge after the circulation has become balanced. 1300 kg. thereof with a solids content of 45% are separated in solid form. 865 kg. are passed as centrate to the aerobic treatment according to the invention, whereby 200 kg. are eliminated and only 665 kg. are returned from the aeration step to the raw sludge and pass again through the centrifuge. The centrifuge can treat the entire quantity within 7 hours per day. With an energy consumption of 13 kw. for the centrifuge and with an efficiency of the aeration of 2.5 kg. $O_2$/kw.-h., an energy consumption for the entire plant of about 350 kw.-h. per day results, which corresponds to 14 kwh./m.$^3$ raw sludge. This low energy consumption attains a far reaching dewatering to a 40–50% sludge which can readily be composted.

With digested sludge a biological treatment of the centrate can be carried out in the same manner, whereby oxidation of the ammonia to nitrate and a biological purification of the highly polluted digester supernatent occur. By mixing the treated centrate with raw water or sludge, denitrification can be attained.

We claim:

1. A process for dewatering organic sludge which has been separated during treatment of waste water comprising:

mechanically separating a portion of the solids from the sludge in highly dewatered form, leaving a sludge-water mixture containing fine and colloidal solids, passing said highly dewatered solids to disposal, subjecting said sludge-water mixture to aerobic biological treatment for a period of time sufficient to oxidize a minimum of 15% of the solids, thickening the aerobic biologically treated sludge-water mixture into a concentrated sludge-water fraction and a waste water largely freed of solids, removing the waste water largely freed of solids from the system; and subjecting the concentrated sludge-water mixture to a further dewatering treatment.

2. A process according to claim 1, wherein said thickening of the aerobic biologically treated sludge water comprises settling the solids in a sedimentation basin.

3. A process according to claim 1, wherein said thickening of the aerobic biologically treated sludge water comprises:

subjecting the sludge water to a vacuum, whereby entrained gas escapes from the sludge and carries the solids to the surface; and removing the solids containing scum from the surface of the liquid.

4. A process according to claim 1, wherein said further dewatering treatment comprises returning the thickened sludge-water mixture to the mechanical separation step.

5. A process according to claim 1, wherein said further dewatering treatment comprises treating the thickened sludge-water mixture on drying beds.

6. A process according to claim 1, wherein one portion of said thickened sludge-water mixture is returned to the mechanical separation step and another portion is returned to the aerobic biological treatment step.

References Cited by the Examiner

UNITED STATES PATENTS

| | | | |
|---|---|---|---|
| 1,999,058 | 4/1935 | Raisch | 210—16 X |
| 2,359,004 | 9/1944 | Schlenz et al. | 210—8 X |
| 2,360,811 | 10/1944 | Kelly et al. | 210—8 |
| 2,615,842 | 10/1952 | Kraus | 210—8 |
| 2,852,584 | 9/1958 | Komline | 210—10 X |
| 3,151,063 | 9/1964 | Gunson | 210—15 X |

OTHER REFERENCES

Tapleshay: Total Oxidation of Organic Wastes, Sewage and Ind. Wastes, vol. 30, May 1958, pp. 652–661.

MORRIS O. WOLK, *Primary Examiner.*

MICHAEL E. ROGERS, *Examiner.*